United States Patent
Weir

[19]

[11] Patent Number: 5,940,443
[45] Date of Patent: Aug. 17, 1999

[54] PARALLEL TELEPHONE BUS SEGMENTATION SYSTEM

[75] Inventor: Steven P. Weir, Petaluma, Calif.

[73] Assignee: Harris Corporation, Melbourne, Fla.

[21] Appl. No.: 08/334,235

[22] Filed: Nov. 4, 1994

[51] Int. Cl.[6] .............................. H04B 3/00; H04L 20/00
[52] U.S. Cl. ...................... 375/257; 379/269; 379/398; 379/399
[58] Field of Search .................................. 375/257, 377; 327/90, 91; 379/219, 269, 225, 242, 357, 398, 394, 399; 333/22 R, 101–105

[56] References Cited

U.S. PATENT DOCUMENTS

| | | | |
|---|---|---|---|
| 3,800,097 | 3/1974 | Maruscak et al. | 179/98 |
| 4,388,725 | 6/1983 | Saito et al. | 375/36 |
| 4,658,333 | 4/1987 | Grimes | 361/413 |
| 4,736,409 | 4/1988 | Hasawgawa et al. | 379/269 |
| 4,756,006 | 7/1988 | Rickard | 375/36 X |
| 4,860,309 | 8/1989 | Costello | 375/36 X |
| 5,179,586 | 1/1993 | Lee | 307/475 X |
| 5,220,211 | 6/1993 | Christopher et al. | 307/443 |
| 5,257,289 | 10/1993 | Jopson | 375/36 |
| 5,463,685 | 10/1995 | Yee | 375/257 |

FOREIGN PATENT DOCUMENTS

| | | | |
|---|---|---|---|
| 4427042 | 2/1994 | Germany | G06F 11/10 |

OTHER PUBLICATIONS

"Scheme for Connecting Processors Through an Open Collector Bus", IBM Technical Disclosure Bulletin, August 1982, vol. 25, pp. 1268–1269.

*Primary Examiner*—Chi H. Pham
*Assistant Examiner*—Bryan Webster
*Attorney, Agent, or Firm*—Sughrue, Mion, Zinn, Macpeak & Seas, PLLC

[57] ABSTRACT

A bus system providing increased connection flexibility and hot pluggable connections includes an open collector bus, a receiver connected to the open collector bus via a current sensor, a driver connected to the open collector bus, a peripheral card and a flexible cable operatively coupling the peripheral card, the receiver and the driver so as to provide point-to-point connection between the peripheral card and the open collector bus. The current sensor provides a control signal to the driver to increase the impedance of the driver in the event that a current is produced by the peripheral card.

14 Claims, 2 Drawing Sheets

PARALLEL TELEPHONE BUS SEGMENTATION SYSTEM

FIELD OF THE INVENTION

The present invention is related to interconnections between data and control busses and peripheral cards. More specifically, the present invention relates to an improved system for interconnecting peripheral devices with busses. Preferably, the present invention is related to an improved system for interconnecting peripheral devices and incorporating protective circuitry facilitating installation and removal of any peripheral device from the system. The present invention is advantageously adapt to private branch exchange (PBX) telephone systems.

BACKGROUND OF THE INVENTION

A prior art system for connecting peripheral cards via a bus is illustrated in FIG. 1, which shows three peripheral card labeled 1, 2 and 3, respectively. Each of the cards is connected by a connector pair 4, 5 and 6, respectively, to a bus 7 via an associated stub 8. Bus 7 is, in essence, a parallel cable running over top of the peripheral cards 1 through 3.

It will be noted from FIG. 1 that only the end peripheral cards, e.g., cards 1 and 3, are provided with terminations, e.g., terminating impedances, which are respectively denoted $R_1$ and $R_3$. The center card 2, on the other hand, does not include a dedicated termination.

It will also be appreciated that close proximity between the peripheral cards 1 through 3 requires that the bus 7 must be removed from at least two of the cards, i.e., cards 1 and 2 or cards 2 and 3, in order to remove card 2 for maintenance or replacement.

U.S. Pat. No. 3,800,097 discloses a bus connection system wherein selectively installed termination cards and jumper cable cards are used. An empty spot on each bus is connected to a terminator card. However, the system taught by U.S. Pat. No. 3,800,097 is connectable to a plurality of peripheral card types via bus interface units but the overall termination of a chain of cards connected to bus interface unit is not considered.

U.S. Pat. No. 4,658,333 discloses a connector system where the user is allowed to selectively choose whether terminal cards or jumper cables, e.g., non-terminating cards, will be used. This allows the user to easily reconfigure arrangement, e.g., the length, of the bus.

U.S. Pat. No. 4,736,409 discloses the use of cards which can be designated as line or trunk cards. Thus, the 4,736,409 patent teaches the user selection of the bus configuration.

U.S. Pat. No. 5,220,211 discloses a high speed bus transceiver with fault tolerant design for hot pluggable applications, which uses a low impedance differential bus and a plurality of transceivers connected to the bus. Each transceiver is provided with a driver circuit which places data onto the bus and receiver for accepting data from the bus. The driver includes a pseudo-differential current driving circuit arrangement, which sinks current from only one side of the bus while the other side of the differential bus is undisturbed. The receiver includes a differential comparator biased to a preferred output voltage level.

Parallel bus connections are susceptible to a plurality of problems. For example, software and hardware faults can easily result in simultaneous activation of multiple contending device. Moreover, improper signal termination produces a host of problems, primarily noise.

Poorly or inadequately terminated busses are a source of noise in prior art bus systems. In particular, the prior art busses are terminated at both ends with resistors whose value equals the characteristic impedance of the bus. This type of termination is referred to as "odd-mode" termination. This type of termination leads to a situation where "common-mode" signals induced in the bus "ring" for excessive periods of time, causing problems with signal integrity, EMI and common-mode range.

In addition to the above-mentioned noise problem, excessive noise or inadequate noise margin can lead to performance problems through data integrity problems or through a need to reduce the clock rate to avoid data integrity problems. There are potentially several types of noise in a bus system including coupled noise, switching noise, EMI/EMC noise and reflection noise. Coupled noise occurs when a signal on a conductor in the bus induces an undesired signal on a neighboring conductor on the bus. Switching noise occurs when current pulses resulting from multiple bits changing states simultaneously can induce undesired signals on power and/or ground which can, in turn, induce erroneous data signals on driver or receiver outputs. EMI/EMC noise occurs when the bus system either radiates unacceptably in certain frequency bands or is unacceptably sensitive to ambient electromagnetic radiation. Reflection noise occurs when reflections arising from impedance mismatches on the bus distort the data signals at the inputs to the receivers. Impedance mismatches can occur at card slots, as well as at the ends of the bus, due to improper termination.

Moreover, the conventional connecting system provide a potential for damaging peripheral cards when these cards are either connected or disconnected to the system while it is in operation.

The present invention was motivated by desire to overcome the problems with respect to the prior art.

SUMMARY OF THE INVENTION

The principal object of the present invention is to provide a peripheral interconnection system for a bus whereby damage of components due to contention is eliminated.

One object of the present invention is to eliminate data errors caused by improper termination configuration in a system interconnecting a bus with a peripheral card.

Another object of the present invention is to eliminate physical damage of system components resulting from improper termination configuration between a bus and one or more associated peripheral cards.

Yet another object of the invention is to provide a connection system between a bus and a peripheral card which permits card insertion and extraction while the system is operating and without disruption. This latter object can be termed a desire to provide a "hot pluggable" connection system.

These and other objects, features and advantages of the invention are provided by a bus system including an open collector bus, a receiver connected to the open collector bus, a driver connected to the open collector bus, a peripheral card and a flexible cable operatively coupling the peripheral card, the receiver and the driver so as to provide point-to-point connection between the peripheral card and the open collector bus.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted by like or similar numbers, and in which.

DESCRIPTION OF THE PREFERRED EMBODIMENTS

Figure 1:
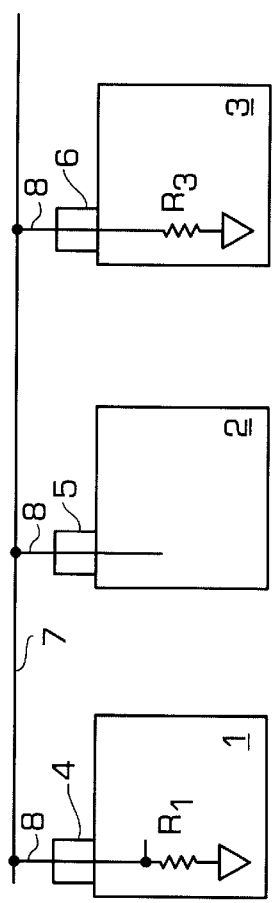
FIG. 1 is a high level schematic diagram which is useful in explaining the operation and interconnection of a conventional bus with a plurality of peripheral cards.
Figure 2:
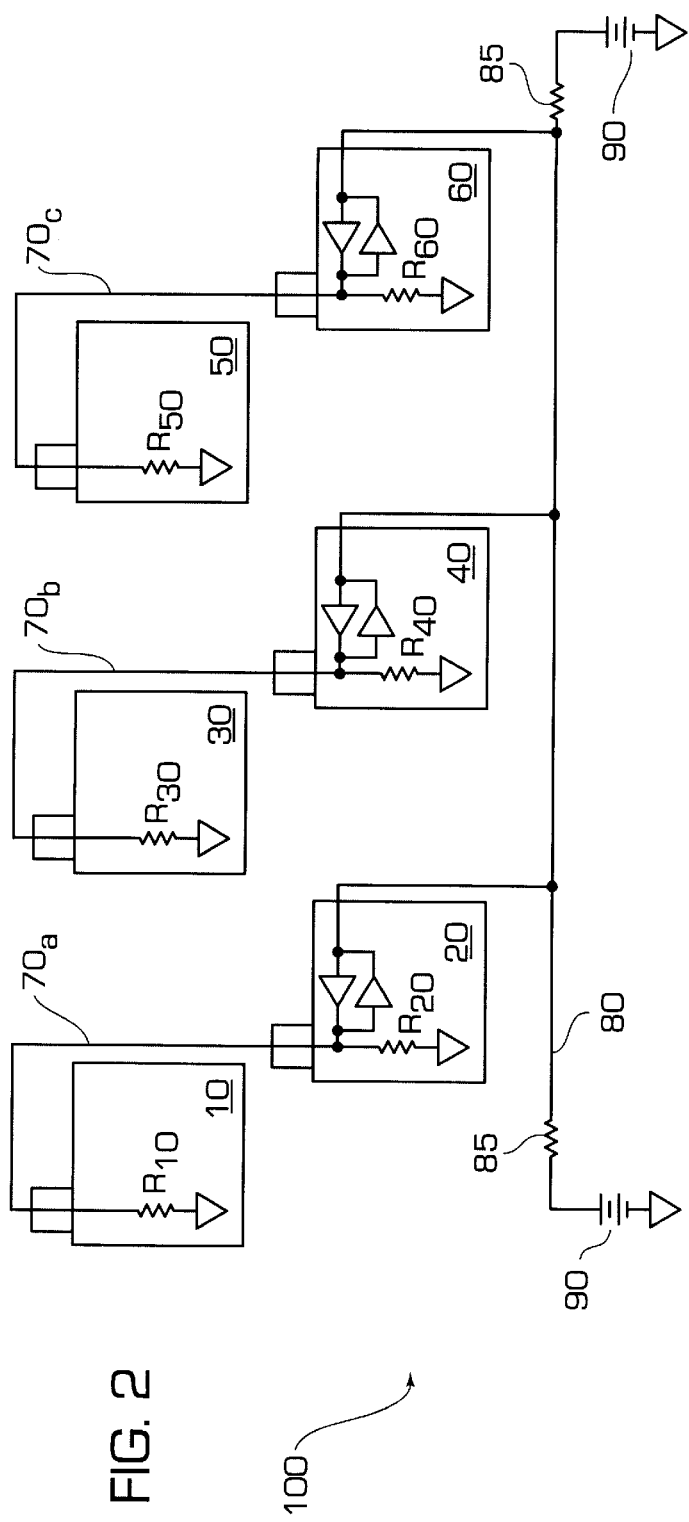
FIG. 2 is a high level schematic diagram which is useful in explaining a preferred embodiment of the present invention.

Bus system 100 shown in FIG. 2 includes a plurality of peripheral cards, e.g., peripheral cards 10, 30 and 50, each including a corresponding termination element. In an exemplary case, termination element for card 10 may be a resistor $R_{10}$. Each of the peripheral cards 10, 30, 50 is connected via a flexible cable, generally denoted 70, to a motherboard, e.g., motherboard 20.

Figure 3:
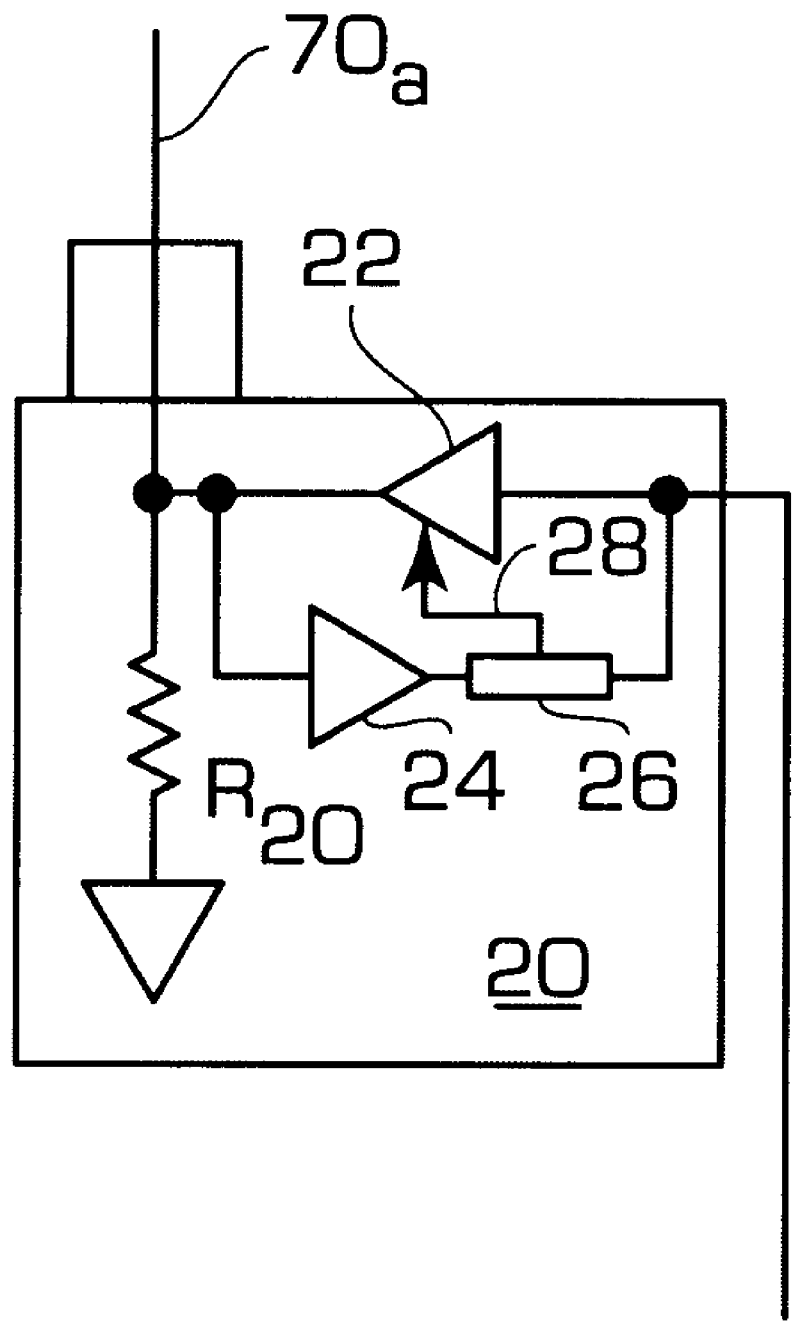
FIG. 3 is a high level block diagram which is useful in explaining the features and operation of specific elements of the circuit depicted in FIG. 2.

Motherboard 20 advantageously includes, as shown in FIG. 3, a driver 22, a receiver 24 and a current sensor 26. Preferably, the output control signal 28 of current sensor 26 is connected to an input control terminal of driver 22. The control signal 28 generated by current sensor 26 advantageously controls at least one parameter of driver 22. Preferably, the parameter controlled by the control signal is impedance. In an exemplary case, a high current flowing through current sensor 26 will cause the impedance of driver 22 to go high.

In addition, a termination element having a predetermined impedance is provided in card 20. The termination element advantageously can be a resistor $R_2O$ Each of the motherboard, 20, 40 and 60 is connected to an open collector bus 80. Preferably, open collector bus 80 includes resistors, generally denoted 85, and power sources generally denoted 90.

As discussed above, bus systems taught by the prior art are laden with weaknesses. The preferred embodiment of the present invention addresses these weaknesses, as discussed immediately below.

With respect to contention, the parallel bus is not directly attached to any of peripheral cards 10, 30, 50. Instead, the parallel bus is replaced with an oncontroller parallel bus which is accessed with open collector drivers.

With respect to signal termination, all peripheral cards are terminated, preferably uniformly. In the prior art busses mentioned above, termination is selective depending on the physical position within the cabinet where the card is to be installed. Preferably, each peripheral card connects point to point with a dedicated set of drivers and receivers, which elements advantageously are terminated.

In an exemplary case, termination on the host controller is to a voltage above the upper voltage detect threshold of the interface logic.

With respect to "Hot Pluggable" support, the current sensor advantageously provided between the each motherboard peripheral card receiver, and the associated driver detects when the peripheral card is attempting to actively drive the signal line high. When this condition occurs, the motherboard peripheral card driver is placed in a high impedance state. This prevents damage or inappropriate operation on both the motherboard and the peripheral card.

The sensing circuits advantageously may be used to detect the presence or lack thereof for an peripheral card. Preferably, connection of the forward drive path from each card to the main bus is removed until (a) the peripheral card is detected, e.g., confirmed to be in place and (b) a suitable time-delay has transpired. The latter condition advantageously insures that operation of the peripheral card is delated until the peripheral card is operating in a stable manner.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A bus system comprising:

an open collector bus;

a receiver connected to said open collector bus;

a driver connected to said open collector bus;

a peripheral card;

a flexible cable operatively coupling said peripheral card to said receiver and said driver so as to provide point-to-point connection between said peripheral card and said open collector bus; and a current sensor coupled to receive an output from said receiver and producing a signal controlling at least one parameter of said driver.

2. The bus system of claim 1, wherein said parameter of said driver is impedance and wherein said signal induces a high impedance operating state in said driver.

3. A bus system comprising:

an open collector bus;

a receiver connected to said open collector bus;

a driver connected to said open collector bus;

a peripheral card;

a flexible cable operatively coupling said peripheral card to said receiver and said driver so as to provide point-to-point connection between said peripheral card and said open collector bus;

a current sensor coupled to receive an output from said receiver and producing a signal controlling at least one parameter of said driver;

wherein each of said peripheral card and said driver have associated therewith a respective termination element and wherein said cable couples said respective termination elements.

4. A bus system comprising:

an open collector bus;

a receiver connected to said open collector bus;

a driver connected to said open collector bus;

a peripheral card;

a flexible cable operatively coupling said peripheral card to said receiver and said driver so as to provide point-to-point connection between said peripheral card and said open collector bus;

a current sensor coupled to receive an output from said receiver and producing a signal controlling at least one parameter of said driver;

wherein each of said peripheral card and said receiver have associated therewith a respective termination element and wherein said cable couples said respective termination elements.

5. A bus system comprising:

an open collector bus;

a plurality of motherboards, each of said motherboards comprising:
   a receiver connected to said open collector bus;
   a driver connected to said open collector bus;
   a termination element;
   a plurality of peripheral cards each of said peripheral cards having a termination element; and
   a plurality of flexible cables each operatively coupling one of said peripheral cards to a respective motherboard so as to provide point-to-point connection between each of said peripheral cards and said open collector bus;
wherein each of said receivers is an open collector receiver; and
wherein each of said motherboards further comprises a current sensor between an associated receiver and an associated driver for producing a signal controlling at least one parameter of an associated driver.

6. A bus system comprising:
an open collector bus;
a plurality of motherboards, each of said motherboards comprising:
   a receiver connected to said open collector bus;
   a driver connected to said open collector bus;
   a termination element;
   a plurality of peripheral cards each of said peripheral cards having a termination element; and
   a plurality of flexible cables each operatively coupling one of said peripheral cards to a respective motherboard so as to provide point-to-point connection between each of said peripheral cards and said open collector bus;
wherein each of said drivers is an open collector driver; and
wherein each of said motherboards further comprises a current sensor between an associated receiver and an associated driver for producing a signal controlling at least one parameter of an associated driver.

7. A bus system comprising:
an open collector bus;
a motherboard including a receiver and a driver connected to said open collector bus and a first termination element, wherein an input terminal of said receiver and an output terminal of said driver are connected at a first node, wherein an output terminal of said receiver and an input terminal of said driver are connected at a second node and wherein said first termination element is connected to said first node;
a peripheral card including a second termination element; and
a flexible cable operatively coupling said peripheral card and said motherboard between said first termination element and said second termination element;
wherein said motherboard further comprises a current sensor between said receiver and said second node for producing a signal controlling at least one parameter of said driver.

8. The bus system of claim 7, wherein said parameter of said driver is impedance and wherein said signal induces a high impedance operating state in said driver.

9. The bus system of claim 7, wherein said receiver is an open collector receiver.

10. The bus system of claim 7, wherein said driver is an open collector driver.

11. The bus system of claim 1, wherein each of said peripheral card and said driver have associated therewith a respective termination element and wherein said cable couples said respective termination elements.

12. The bus system of claim 1, wherein each of said peripheral card and said receiver have associated therewith a respective termination element and wherein said cable couples said respective termination elements.

13. The bus system of claim 1, wherein said receiver is an open collector receiver.

14. The bus system of claim 1 wherein said driver is an open collector driver.

* * * * *